US007177449B2

(12) United States Patent
Russon et al.

(10) Patent No.: US 7,177,449 B2
(45) Date of Patent: Feb. 13, 2007

(54) IMAGE CORRECTION SYSTEM AND METHOD

(75) Inventors: Virgil Kay Russon, Greeley, CO (US); Scott Clinton Baggs, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 665 days.

(21) Appl. No.: 10/183,584

(22) Filed: Jun. 26, 2002

(65) Prior Publication Data
US 2004/0001614 A1    Jan. 1, 2004

(51) Int. Cl.
G06K 9/00    (2006.01)
(52) U.S. Cl. .................................................. 382/117
(58) Field of Classification Search .............. 382/117
See application file for complete search history.

(56) References Cited

U.S. PATENT DOCUMENTS

| | | | |
|---|---|---|---|
| 5,231,674 A | 7/1993 | Cleveland et al. ............. 382/6 |
| 5,432,863 A | 7/1995 | Benati et al. ................ 382/167 |
| 5,438,357 A * | 8/1995 | McNelley ................. 348/14.1 |
| 5,499,303 A | 3/1996 | Hundt et al. |
| 5,906,005 A * | 5/1999 | Niskala et al. ................. 2/206 |
| 5,990,973 A | 11/1999 | Sakamoto .................... 348/576 |
| 6,016,354 A | 1/2000 | Lin et al. .................... 382/117 |
| 6,134,339 A | 10/2000 | Luo ............................ 382/115 |
| 6,278,491 B1 | 8/2001 | Wang et al. ................ 348/370 |
| 6,381,339 B1 * | 4/2002 | Brown et al. ............... 382/100 |
| 6,895,103 B2 * | 5/2005 | Chen et al. ................. 382/117 |

FOREIGN PATENT DOCUMENTS

WO    WO 97/04420    2/1997

OTHER PUBLICATIONS

Liu, Zicheng, Zhang, Zhengyou, Jacobs, Chuch, Cohen, Michael. Rapid Modeling of Animated Faces From Video. Microsoft Research, Feb. 28, 2000.*
Japanese Patent Abstract, JP2000137789, published May 16, 2000, Applicant: SHARP, 2 pgs.

* cited by examiner

*Primary Examiner*—Joseph Mancuso
*Assistant Examiner*—Jonathan Schaffer

(57)    ABSTRACT

An image correction system comprises a detection application accessible by a processor and adapted to identify a viewing direction of at least one eye of a subject within an image. The system also comprises a reconstruction application accessible by the processor and adapted to automatically modify the image to modify the viewing direction of the at least one eye of the subject.

33 Claims, 4 Drawing Sheets

IMAGE CORRECTION SYSTEM AND METHOD

TECHNICAL FIELD OF THE INVENTION

The present invention relates generally to the field of imaging systems and, more particularly, to an image correction system and method.

BACKGROUND OF THE INVENTION

There are a variety of problems associated with the eyes of a subject of a captured image. One relatively familiar problem associated with photographs and other types of images is red-eye. Various systems and methods have been proposed to reduce or practically eliminate red-eye. These systems and methods may be used either during image collection, in conjunction with image processing, or both.

However, other problems associated with the eyes of a subject within an image may be present. For example, the subject may blink during image collection, thereby resulting in the subject having closed eyes in the captured image. The subject may also glance away from a camera or other image collection device during image collection, thereby resulting in the subject's eyes being shifted away from looking directly at the image collection device. Often, if a problem is detected during image collection, another image or photograph may be taken to obtain an image without the defect. However, additional images to correct the problem generally results in additional processing costs and material waste. Additionally, if the problem is not discovered until image processing, capturing the image may no longer be an option, thereby resulting in a loss of the image.

SUMMARY OF THE INVENTION

In accordance with one embodiment of the present invention, an image correction system comprises a detection application accessible by a processor and adapted to identify a viewing direction of at least one eye of a subject within an image. The system also comprises a reconstruction application accessible by the processor and adapted to automatically modify the image to modify the viewing direction of the at least one eye of the subject.

In accordance with another embodiment of the present invention, a method for image correction comprises receiving an image comprising at least one subject and determining a viewing direction from the image of at least one eye of the subject. The method also comprises automatically modifying the image to change the viewing direction of the at least one eye.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

The preferred embodiments of the present invention and the advantages thereof are best understood by referring to FIGS. 1–5 of the drawings, like numerals being used for like and corresponding parts of the various drawings.

Figure 1:
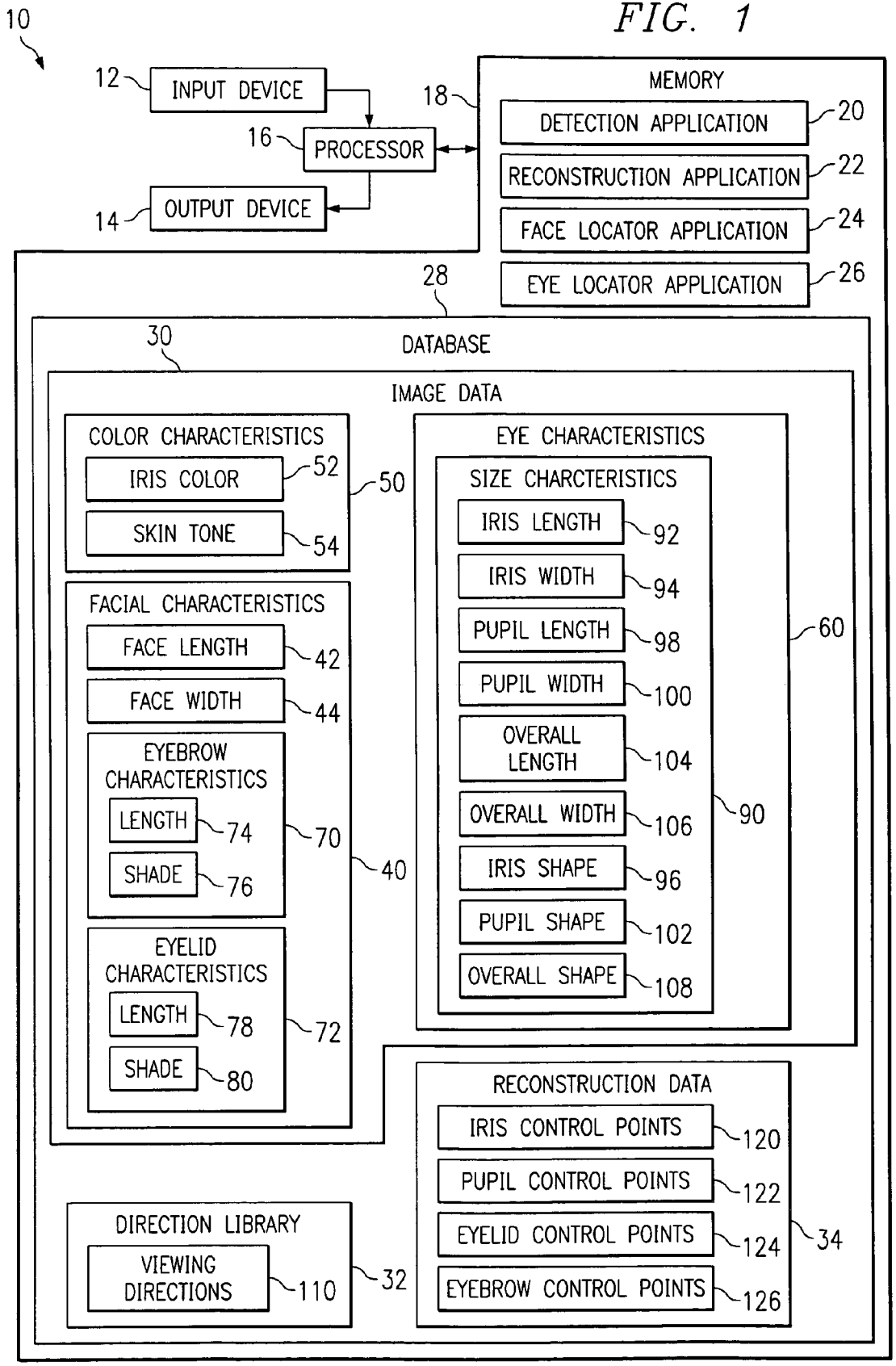
FIG. 1 is a diagram illustrating an embodiment of an image correction system in accordance with the present invention.

FIG. 1 is a diagram illustrating an embodiment of an image correction system 10 in accordance with the present invention. Briefly, system 10 automatically determines whether a viewing direction of the eyes of a subject within an image are directed toward or away from a desired viewing direction, such as directed toward someone viewing the image. For example, the eyes of a subject within an image may be shifted in a particular direction relative to an image-capturing device, such as a camera, at the moment the image is captured. System 10 acquires various characteristics associated with the subject, locates the eyes of the subject, and modifies the image by reconstructing the eyes of the subject to correspond with a desired viewing direction, such as toward the image-capturing device.

In the illustrated embodiment, system 10 comprises an input device 12, an output device 14, a processor 16, and a memory 18. Input device 12 may comprise a keyboard, keypad, pointing device, such as a mouse or a track pad, a scanner, an image-collection device, such as a digital camera, or other type of device for inputting information into system 10. Output device 14 may comprise a monitor, display, printer, or other type of device for generating an output.

The present invention also encompasses computer software that may be executed by processor 16. In the illustrated embodiment, memory 18 comprises a detection application 20, a reconstruction application 22, a face locator application 24, and an eye locator application 26, which are computer software programs. However, it should be understood that system 10 may be configured having hardware, software, or a combination of hardware and software components. In the embodiment of FIG. 1, applications 20, 22, 24, and 26 are illustrated as being stored in memory 18, where they may be executed by processor 16. However, applications 20, 22, 24, and 26 may be otherwise stored as to be accessible by processor 16.

In the illustrated embodiment, system 10 also comprises a database 28 stored in memory 18. Database 28 comprises information associated with correcting a viewing direction of the eyes of a subject within an image. For example, in the illustrated embodiment, database 28 comprises image data 30, a direction library 32, and reconstruction data 34. Briefly, information associated with the subject within the image is acquired and stored as image data 30. Image data 30 is then compared to information contained within direction library 32 to determine a particular viewing direction of the eyes of the subject within the image. Reconstruction data 34 is then generated for modifying the image to correct the captured viewing direction of the eyes of the subject to be coincident with a desired viewing direction.

In operation, system 10 may be configured such that face locator application 24 automatically locates each face within an image. For example, face locator application 24 may locate and use pixel characteristics generally associated with defining a face, such as the outline of a face, or with various features of a face, such as eyebrows, to automatically locate each face within the image. Thus, after receiving an image, face locator application 24 may automatically locate and identify each face within the image for a determination of whether each subject within the image requires viewing direction correction. Alternatively, system 10 may be adapted such that a user of system 10 may select a particular face within the image for correction using input device 12.

System 10 may also be configured such that eye locator application 26 automatically locates the eyes corresponding to each face within the image. For example, detection application 20 may acquire various characteristics associated with a face of a subject and store the acquired characteristic data as facial characteristics 40 in database 28. Facial characteristics 40 may comprise a face length 42 and a face width 44 corresponding to a face of a particular subject within the image. Facial characteristics 40 may be determined using pixel characteristics within the image or, alternatively, a user of system 10 may use input device 12 to select various features of a particular face to acquire facial characteristics 40. Based on the acquired facial characteristics 40 for a particular face within the image, eye locator application 26 may automatically locate and identify the eyes of a subject within the image. Alternatively, a user of system 10 may locate and select each eye of a particular subject within the image for correction using input device 12.

Detection application 20 acquires information from the image corresponding to a particular subject and stores the information as image data 30. For example, in the illustrated embodiment, image data 30 comprises facial characteristics 40, color characteristics 50, and eye characteristics 60. Color characteristics 50 comprises color information associated with a particular subject within the image such as, but not limited to, iris color 52 and skin tone 54. Iris color 52 corresponds to a color of an iris of the eye of a particular subject within the image. Skin tone 54 comprises information associated with a skin color of a particular subject within the image. Detection application 20 may acquire skin tone 54 by acquiring color information associated with a particular location on the face of a subject or may generate skin tone 54 by combining multiple color characteristics from various portions of a face of a subject.

As described above, facial characteristics 40 may comprise face length 42 and face width 44. Facial characteristics 40 may also comprise eyebrow characteristics 70 and eyelid characteristics 72. Eyebrow characteristics 70 may comprise information associated with the eyebrows of a particular subject within the image such as, but not limited to, a length 74 and a shape 76. Eyelid characteristics 72 comprises information associated with the eyelids of a particular subject within the image such as, but not limited to, a length 78 and a shape 80. As will be described in greater detail below, facial characteristics 40 may be used to determine a facial or viewing direction of a face and/or the eyes of a particular subject and may also be used during reconstruction of the eyes of a particular subject corresponding to a desired viewing direction.

Eye characteristics 60 comprises information associated with the eyes of a particular subject such as, but not limited to, size characteristics 90. Size characteristics 90 comprises information associated with a size and/or shape of various features associated with the eyes of a particular subject within the image. For example, size characteristics 90 may comprise iris length 92 and iris width 94. Iris length 92 and iris width 94 may be used to determine an iris shape 96 corresponding to an iris of an eye of a particular subject within the image. As will be described in greater detail below, iris shape 96 and other characteristics associated with the iris of an eye within the image may be used to determine a viewing direction corresponding to a particular subject within the image.

Size characteristics 90 may also comprise a pupil length 98 and a pupil width 100. Pupil length 98 and pupil width 100 may be used to determine a pupil shape 102 corresponding to a pupil of an eye within the image. Pupil shape 102 and other characteristics associated with the pupil of a subject within the image may also be used to determine a viewing direction corresponding to a particular subject within the image.

Size characteristics 90 may also comprise an overall length 104 and an overall width 106 corresponding to an eye of a subject within the image. Length 104 and width 106 may comprise information associated with an overall shape 108 of an eye, for example, including the pupil, iris, and white portions of an eye. Additionally, shape 108 may be used to determine a viewing direction corresponding to the eye of a particular subject within the image.

Size characteristics 90 may be acquired by detection application 20 using a variety of methods, such as, but not limited to, pixel characteristic variations within the image, or may be acquired in response to a user selection of various points relative to a particular feature of an eye using input device 12. For example, a user of system 10 may use input device 12 to select one or more locations along a border of an iris, a pupil, or other portion of an eye of a subject within the image. The selected locations may then be used to determine characteristics such as iris shape 96, pupil shape 102, and overall shape 108.

After obtaining image data 30 corresponding to a particular subject within the image, reconstruction application 22 accesses direction library 32. Direction library 32 comprises information associated with viewing directions 110 of an eye corresponding to various features or characteristics of the eye. For example, reconstruction application 22 may determine a viewing direction 110 corresponding to an eye of a particular subject using eye characteristics 60 such as, but not limited to, iris shape 96, pupil shape 102, and/or overall shape 108. Eyebrow characteristics 70 and eyelid characteristics 72 may also be used to determine a particular viewing direction 110 corresponding to an eye of a subject within the image.

Reconstruction application 22 generates reconstruction data 34 corresponding to a desired viewing direction 110 for the subject within the image. For example, reconstruction application 22 may be configured such that a desired viewing direction 110 corresponds to a direction coincident with the subject looking directly at an image-capturing device. For example, a desired viewing direction 110 may be selected such that the eyes of a particular subject within the image are directed toward the image-capturing device within a predetermined angular tolerance. Based on the desired viewing direction 110, reconstruction application 22 modifies the image by reconstructing the eyes within the image corresponding to a particular subject using image data 30.

Reconstruction data 34 comprises information associated with reconstructing the eye of a subject within the image. For example, reconstruction application 22 may generate control points defining one or more features associated with the eye of a subject corresponding to a desired viewing direction 110 for the eye of the subject. Alternatively, reconstruction application 22 may generate other geometric data such as, but not limited to, ellipse axes, relative angular directions of the axes, ellipse dimensions along the axes, and an ellipse center to define the shape of the eye of the subject. In the illustrated embodiment, reconstruction data 34 comprises iris control points 120, pupil control points 122, eyelid control points 124, and eyebrow control points 126.

Iris control points 120 may comprise a plurality of points generated by reconstruction application 22 defining one or more features associated with an iris of a subject within the image such as, but not limited to, inner and outer borders of the iris. Pupil control points 122 may comprise a plurality of points generated by reconstruction application 22 defining various features of a pupil of the subject such as, but not limited to, an outer border of the pupil adjacent to the iris. Eyelid control points 124 may comprise points generated by reconstruction application 22 corresponding to an eyelid relative to a particular eye of a subject within the image. For example, based on a particular viewing direction 110 of any eye, various characteristics of the eyelid relative to the eye may vary. Accordingly, reconstruction application 22 modifies the image to change various features associated with an eyelid of the subject corresponding to a desired viewing direction 110 of an eye of the subject. Eyebrow control points 126 may comprise points generated by reconstruction application 22 corresponding to an eyebrow of the subject. For example, based on a particular viewing direction 110 of an eye, various features of an eyebrow of the subject corresponding to the particular eye may vary. Reconstruction application 22 generates eyebrow control points 126 for modifying the eyebrow of the subject corresponding to a desired viewing direction 110 for a particular eye of the subject.

Thus, in operation, detection application 20 acquires image data 30 corresponding to a particular subject within the image. Detection application 20 acquires color characteristics 50, facial characteristics 40, and eye characteristics 60 corresponding to a particular subject within the image. Based on the acquired image data 30, reconstruction application 22 determines a viewing direction 110 corresponding to the eyes of the particular subject. Reconstruction application 22 then reconstructs the eyes of the subject corresponding to a desired viewing direction 110. Reconstruction application 22 preferably generates control points 120, 122, 124, and 126 corresponding to the desired viewing direction 110 for an iris, pupil, eyelid, and eyebrow, respectively, for the subject within the image. Reconstruction application 22 may use color characteristics 50 for generating the reconstructed eye such as, iris color 52 for coloring the iris of the reconstructed eye, and skin tone 54 for coloring various skin portions proximate to the eye, such as the eyelid. Reconstruction application 22 also preferably blends portions of the reconstructed eye into adjacent portions within the image to obtain a smooth transition between the modified portion of the image and the unmodified portion of the image.

Figure 2:
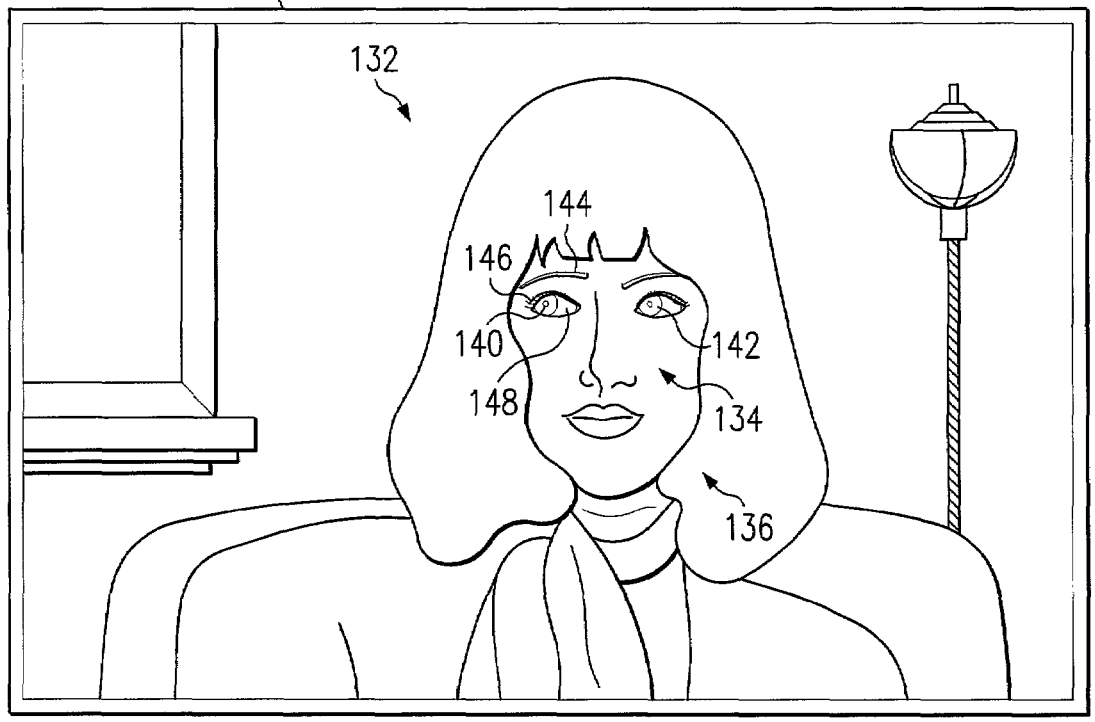
FIG. 2 is a diagram illustrating an image for image correction using an embodiment of an image correction system in accordance with the present invention.
Figure 3:
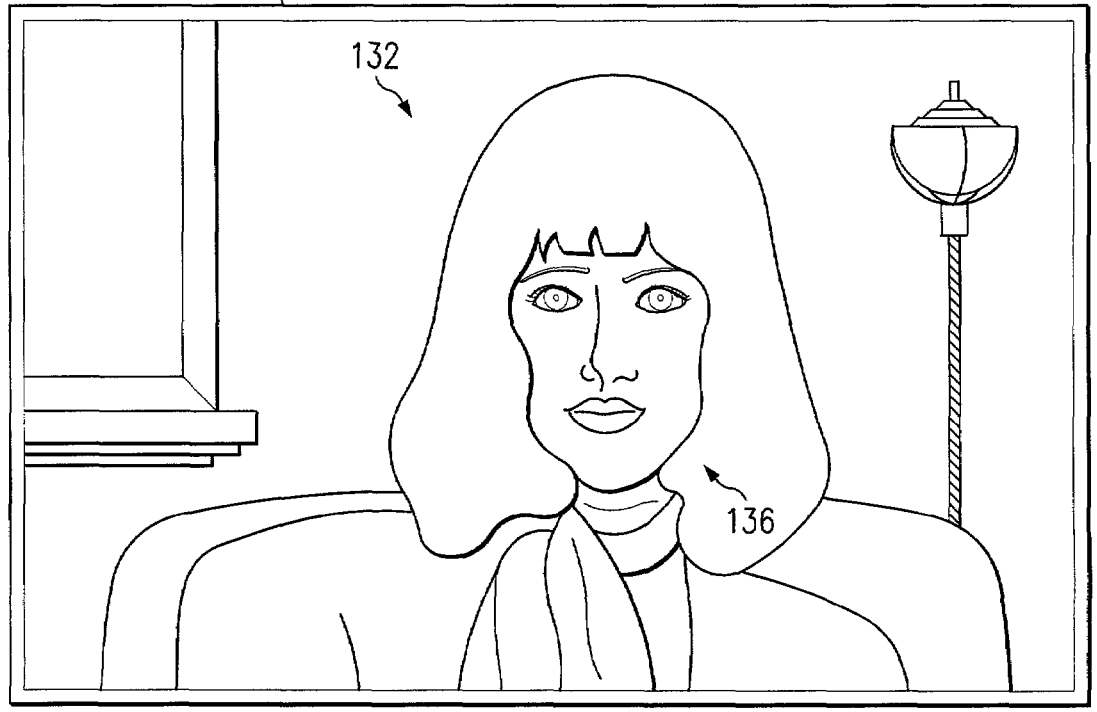
FIG. 3 is a diagram illustrating the image of FIG. 2 after image correction using an embodiment of an image correction system in accordance with the present invention.
Figure 4:
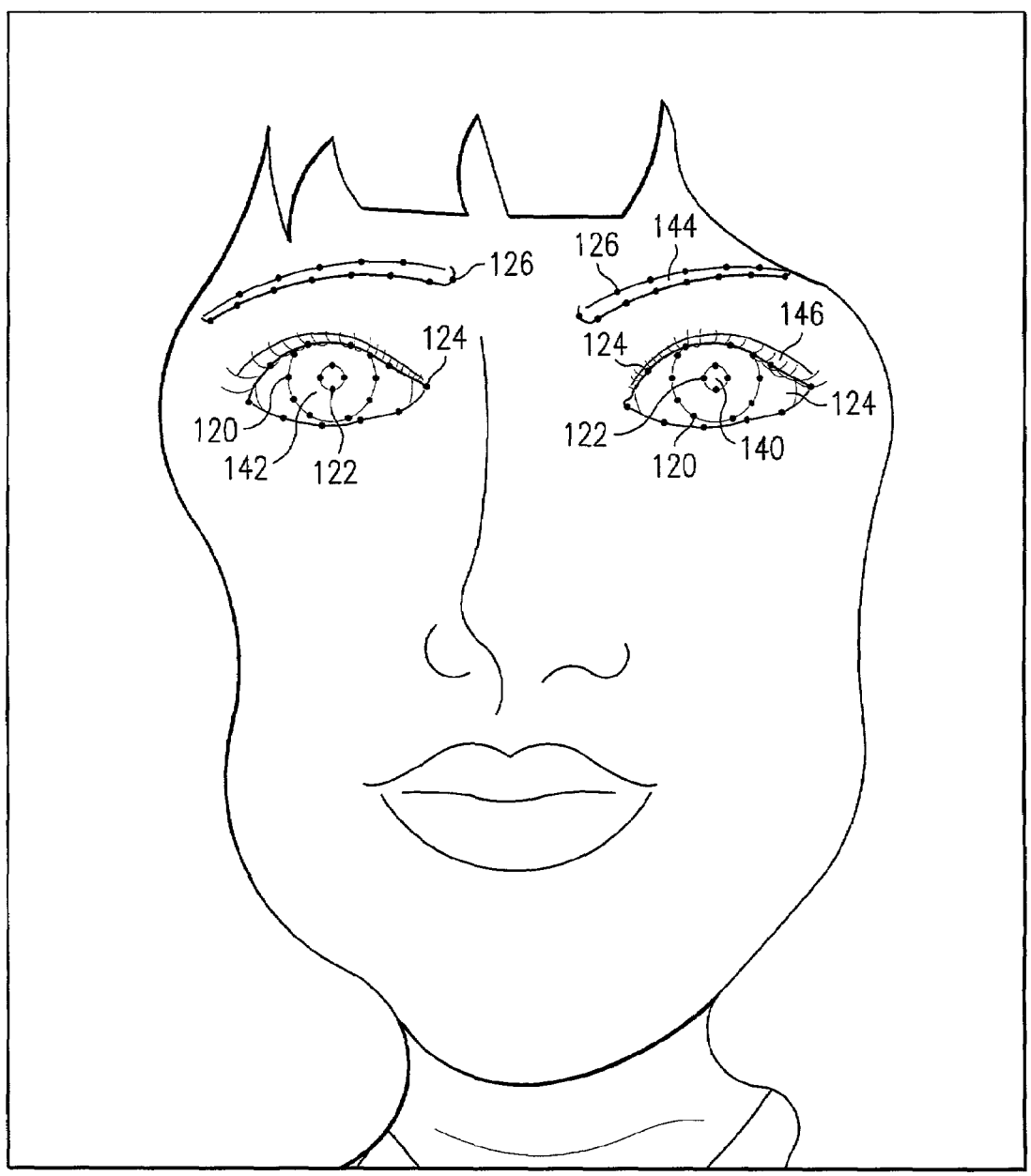
FIG. 4 is a diagram illustrating an image for image correction using an embodiment of an image correction system in accordance with the present invention.

FIG. 2 is a diagram illustrating an image 130 before image correction, and FIGS. 3 and 4 are diagrams illustrating image 30 after correction using an embodiment of the present invention. In the illustrated embodiment, image 130 comprises a subject 132. Although in the illustrated embodiment only a single subject 132 is shown, it should be understood that system 10 may be used to perform image correction on each of a plurality of subjects within the image 130. As best illustrated in FIG. 2, the direction of each eye 134 of subject 132 is generally shifted away from the image-capturing device at the time the image was captured, thereby resulting in eyes 134 of subject 132 looking away from the image-capturing device.

In operation, face locator application 24 may be configured to automatically locate and identify a face 136 of subject 132 within image 130. Alternatively, a user of system 10 may use input device 12 to select and identify face 136 of subject 132 within image 130. Additionally, system 10 may be configured such that eye locator application 26 automatically locates eyes 134 of subject 132 within image 130. However, system 10 may also be configured such that a user of system 10 identifies and selects eyes 134 of subject 132 within image 130.

In operation, detection application 20 acquires image data 30 from image 130 such as color characteristics 50, facial characteristics 40, and eye characteristics 60. For example, detection application 20 may acquire various information corresponding to a pupil 140, an iris 142, an eyebrow 144, and an eyelid 146 for each eye 134 of subject 132. Thus, iris color 52, iris length 92, and iris width 94 may be acquired corresponding to iris 142 of subject 132 for determining iris shape 96. Similarly, pupil length 98 and pupil width 100 may be acquired corresponding to pupil 140 to determine pupil shape 102.

Detection application 20 may also acquire overall length 104 and overall width 106 corresponding to eye 134 of subject 132 to determine overall shape 108 of eye 134. For example, detection application 20 may use pixel variations within image 130 to differentiate between pupil 140, iris 142, and white portion 148 of each eye 134 for determining size characteristics 90 corresponding to each eye 134. Alternatively, a user of system 10 may use input device 12 to select various points within image 130 to identify pupil 140, iris 142, eyebrow 144, eyelid 146, and white portion 148 of eye 134.

After detection application 20 acquires at least a portion of image data 30, reconstruction application 22 accesses direction library 32 to determine a viewing direction 110 corresponding to the acquired image data 30. For example, direction library 32 may comprise a table correlating various shapes and/or sizes of an eye to a particular viewing direction 110. Thus, in operation, reconstruction application 22 uses all or a portion of image data 30 collected by detection application 20 to determine a particular viewing direction 110 corresponding to eyes 134 of subject 132.

Referring to FIGS. 3 and 4, reconstruction application 22 then generates reconstruction data 34 corresponding to a desired viewing direction 110 of eyes 134 of subject 132. For example, as best illustrated in FIG. 3, the direction of eyes 134 of subject 132 are generally coincident with the image-capturing device used to collect image 130. However, system 10 may also be adapted to reconstruct viewing direction 110 of eyes 134 corresponding to a user-selected angle relative to the image capturing-device.

As best illustrated in FIG. 4, reconstruction application 22 generates control points 120, 122, 124, and 126 for reconstructing image 130 corresponding to iris 142, pupil 140, eyelid 146, and eyebrow 144, respectively. Reconstruction application 22 may access direction library 32 to determine various sizes and shapes of characteristics associated with eyes 134 corresponding to a desired viewing direction. Additionally, reconstruction application 22 may access other image data 30, such as, but not limited to, size characteristics 90, eyebrow characteristics 70, and eyelid characteristics 72, to correctly size various features associated with eyes 134 with respect to subject 132. Features associated with control points 120, 122, 124, and 126 may then be generated using points 120, 122, 124, and 126 as a guide. Reconstruction application 22 may also access iris tone 52 and skin tone 54 to color various features associated with eyes 134, such as iris 142 and flesh portions proximate to eyes 134.

Figure 5:
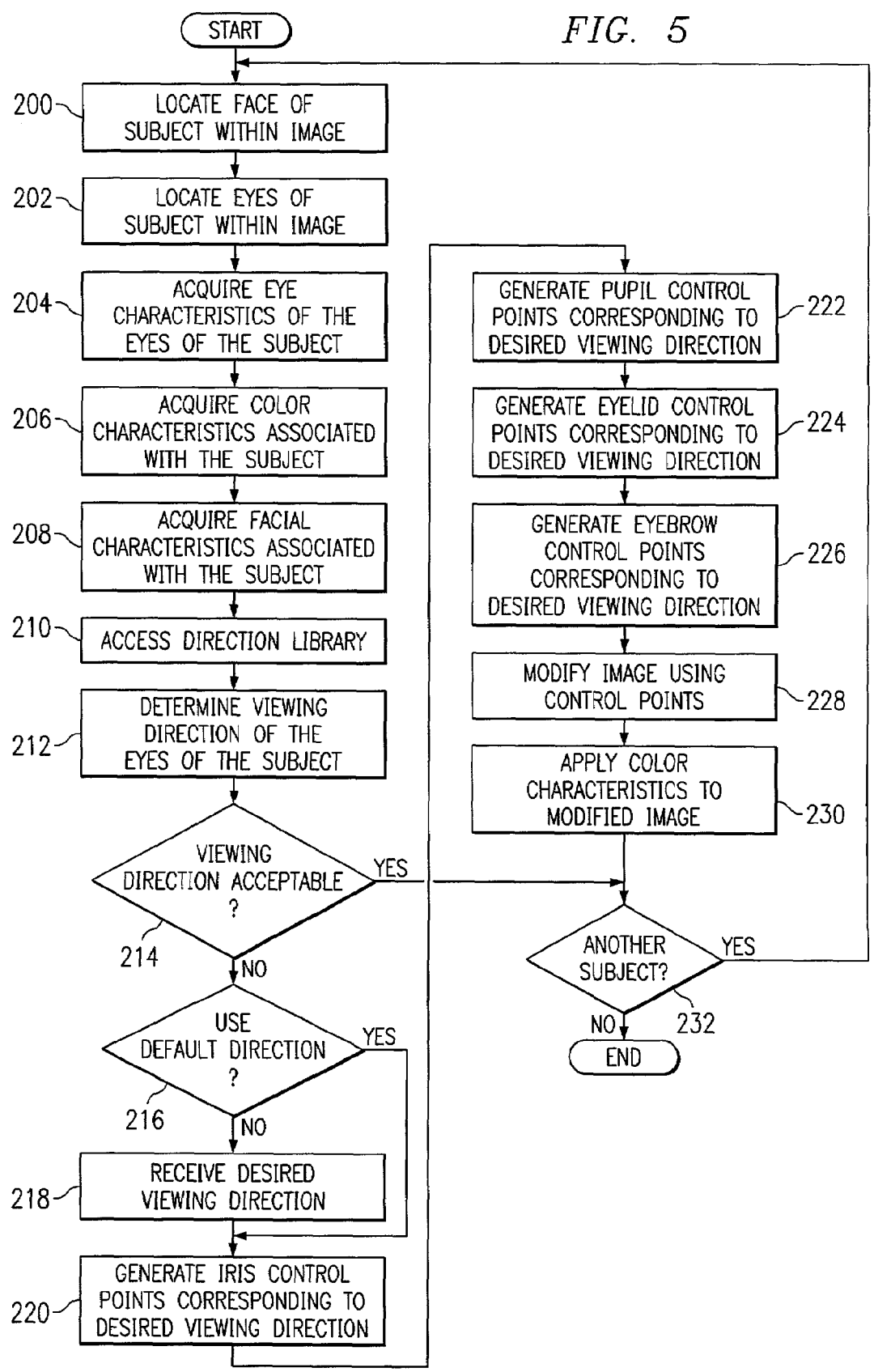
FIG. 5 is a flowchart illustrating a method for image correction in accordance with an embodiment of the present invention.

FIG. 5 is a flowchart illustrating a method for image correction in accordance with an embodiment of the present invention. The method begins at step 200, where face locator application 24 automatically locates face 136 of subject 132 within image 130. At step 202, eye locator application 26 automatically locates eyes 134 of subject 132 within image 130.

At step 204, detection application 20 acquires eye characteristics 60 corresponding to subject 132. For example, detection application 20 may acquire iris length 92, iris width 94, pupil length 98, and pupil width 100. Additionally, detection application 20 may automatically determine overall length 104 and width 106 corresponding to eyes 134. Further, detection application 20 may automatically determine iris shape 96, pupil shape 102, and overall shape 108 corresponding to eyes 134 using acquired size characteristics 90.

At step 206, detection application 20 acquires color characteristics 50 associated with subject 132. For example, detection application 20 may acquire iris color 52 corresponding to the color of the iris of eyes 134. Detection application 20 may also acquire skin tone 54 corresponding to a skin color of subject 132. At step 208, detection application 20 acquires facial characteristics 40 corresponding to subject 132. For example, detection application 20 may acquire face length 42 and width 44 corresponding to face 136 of subject 132. Additionally, detection application 20 may acquire eyebrow characteristics 70 and eyelid characteristics 72 corresponding to eyebrow 144 and eyelids 146, respectively, of subject 132.

At step 210, detection application 20 accesses direction library 32. At step 212, detection application 20 determines a viewing direction 110 corresponding to eyes 134 of subject 132. For example, as described above, direction library 32 may comprise a relational database relating sizes, shapes, and other features associated with the eyes of a subject within an image to a particular viewing direction.

At decisional step 214, if the present viewing direction 110 of eyes 134 is acceptable, the method proceeds from step 214 to step 232. If the present viewing direction 110 of eyes 134 is not acceptable, the method proceeds from step 214 to decisional step 216, where a user of system 10 may be prompted regarding a desired viewing direction 110. For example, if a user of system 10 desires to specify a particular viewing direction 110, the method proceeds from step 216 to step 218, where reconstruction application 22 may receive a desired viewing direction 110 from the user via input device 12. If a particular viewing direction 110 is not requested or specified by the user of system 10, a default viewing direction 110 may automatically be used and the method proceeds from step 216 to step 220.

At step 220, reconstruction application 22 generates iris control points 120 corresponding to a desired viewing direction 110. At step 222, reconstruction application 22 generates pupil control points 122 corresponding to a desired viewing direction 110. At step 224, reconstruction application 22 generates eyelid control points 124 corresponding to a desired viewing direction 110. At step 226, reconstruction application 22 generates eyebrow control points 126 corresponding to a desired viewing direction 110.

At step 228, reconstruction application 22 modifies image 130 corresponding to the desired viewing direction 110. For example, iris 142, pupil 140, eyelid 146, and eyebrow 144 may be modified within image 130 using control points 120, 122, 124, and 126 corresponding to a desired viewing direction 110. At step 230, reconstruction application 22 applies color characteristics 50 to image 130 corresponding to reconstructed eyes 134. For example, reconstruction application 22 may apply iris color 52 to iris 142 of eyes 134. Additionally, reconstruction application 22 may apply skin tone 54 to skin portions proximate to eyes 134 generated during image 130 reconstruction. At decisional step 232, a determination is made whether another subject 132 within image 130 requires correction. If another subject 132 within image 130 requires correction, the method returns to step 200. If another subject 132 within image 130 does not require correction, the method ends.

It should be understood that in the described method, certain steps may be omitted, accomplished in a sequence different from that depicted in FIG. 5, or performed simultaneously. For example, referring to FIG. 5, steps 204 and 208 may be accomplished simultaneously and at any time prior to the step 212 of determining the viewing direction of the eyes of the subject. Also, it should be understood that the method depicted in FIG. 5 may be altered to encompass any of the other features or aspects of the invention as described elsewhere in the specification.

What is claimed is:

1. An image correction system, comprising:
   a detection application accessible by a processor and adapted to identify a viewing direction of at least one eye of a subject within an image; and
   a reconstruction application accessible by the processor and adapted to automatically modify the image to modify the viewing direction of the at least one eye of the subject to a user-specified direction.

2. The system of claim 1, wherein the detection application is adapted to acquire data from the image corresponding to the eye of the subject.

3. The system of claim 2, wherein the reconstruction application is adapted to modify the eye within the image using the acquired data.

4. The system of claim 1, wherein the detection application is adapted to acquire at least one color characteristic associated with the eye of the subject from the image.

5. The system of claim 4, wherein the reconstruction application is adapted to modify the eye within the image using the at least one acquired color characteristic.

6. The system of claim 1, wherein the detection application is adapted to acquire at least one facial characteristic associated with the subject from the image.

7. The system of claim 6, wherein the reconstruction application is adapted to modify the eye within the image using the at least one facial characteristic.

8. The system of claim 1, further comprising a locator application accessible by the processor and adapted to automatically locate a face of the subject within the image.

9. The system of claim 1, wherein the detection application is adapted to acquire at least one size characteristic associated with the eye from the image.

10. The system of claim 9, wherein the detection application is adapted to determine the viewing direction of the eye using the at least one size characteristic.

11. A method for image correction, comprising:
    receiving an image comprising at least one subject;
    determining a viewing direction from the image of at least one eye of the subject; and
    automatically modifying the image to change the viewing direction of the at least one eye based on a user-specified direction.

12. The method of claim 11, wherein determining a viewing direction comprises acquiring at least one size characteristic of the eye from the image.

13. The method of claim 11, wherein determining a viewing direction comprises determining a pupil location of the eye from the image.

14. The method of claim 11, further comprising acquiring at least one color characteristic of the eye from the image.

15. The method of claim 14, wherein modifying the image comprises reconstructing the eye of the subject using the at least one color characteristic.

16. The method of claim 11, wherein modifying the image comprises modifying a pupil location of the eye.

17. The method of claim 11, wherein modifying the image comprises modifying a shape of a pupil of the eye.

18. The method of claim 11, wherein modifying the image comprises modifying a shape of an eyelid of the subject corresponding to the eye.

19. The method of claim 11, determining a viewing direction of the eye comprises:
   acquiring at least one shape characteristic of an iris of the eye from the image; and
   comparing the at least one shape characteristic to an eye shape characteristic database.

20. The method of claim 11, further comprising generating a plurality of control points to define a shape of the reconstructed eye.

21. An image correction system, comprising:
   a detection application accessible by a processor and adapted to acquire data from an image to determine a viewing direction of a subject within the image; and
   a reconstruction application accessible by the processor and adapted to modify the image using the acquired data to obtain a user-specified viewing direction of the subject.

22. The system of claim 21, wherein the detection application is adapted to determine the viewing direction using a shape of an eye of the subject.

23. The system of claim 21, wherein the detection application is adapted to determine at least one color characteristic associated with an eye of the subject.

24. The system of claim 23, wherein the reconstruction application is adapted to reconstruct an image of the eye corresponding to the desired viewing direction using the color characteristic.

25. The system of claim 21, wherein the reconstruction application is adapted to generate a plurality of control points defining a shape of an eye of the subject corresponding to the desired viewing direction.

26. An image correction system, comprising:
   means for receiving an image;
   means for determining a viewing direction of a subject within the image; and
   means for automatically modifying the image to obtain a user-specified viewing direction of the subject.

27. The system of claim 26, wherein the determining means is adapted to determine a shape of an eye of the subject.

28. The system of claim 26, wherein the modifying means is adapted to generate a plurality of control points defining a shape of an eye of the subject corresponding to the desired viewing direction.

29. The system of claim 26, wherein the determining means is adapted to determine at least one color characteristic associated with an eye of the subject.

30. The system of claim 29, wherein the modifying means is adapted to modify an image of the eye corresponding to the desired viewing direction using the color characteristic.

31. The system of claim 26, further comprising storage means comprising information correlating a viewing direction of an eye with a shape of the eye.

32. The system of claim 26, wherein the determining means is adapted to determine dimensional characteristics associated with an eye of the subject.

33. The system of claim 26, further comprising locating means adapted to automatically locate an eye of the subject within the image.

* * * * *